July 5, 1932. LE ROY H. HOFFER 1,865,519
WELDING APPARATUS
Filed Feb. 5, 1930 3 Sheets-Sheet 1
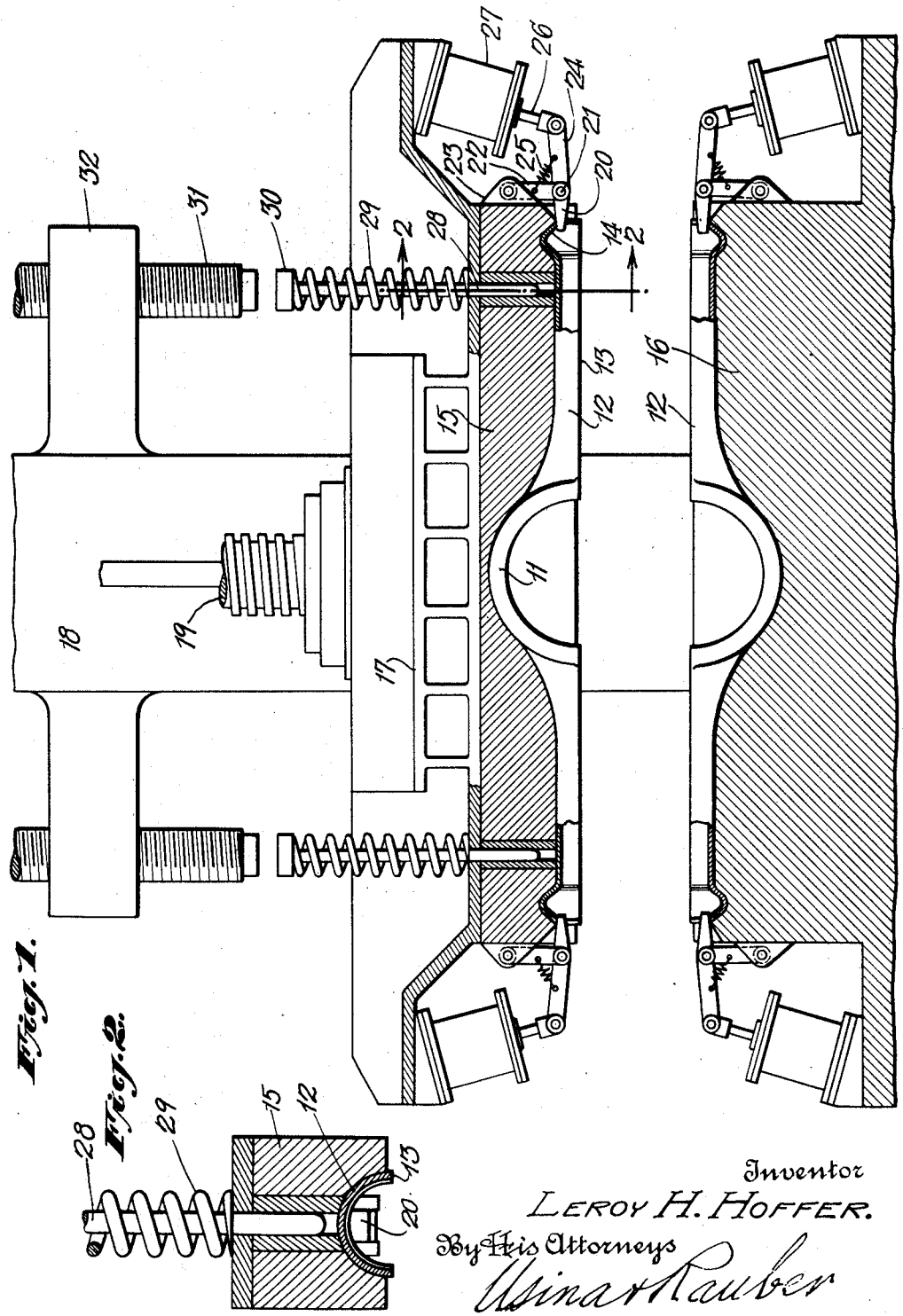
Inventor
LEROY H. HOFFER.
By His Attorneys

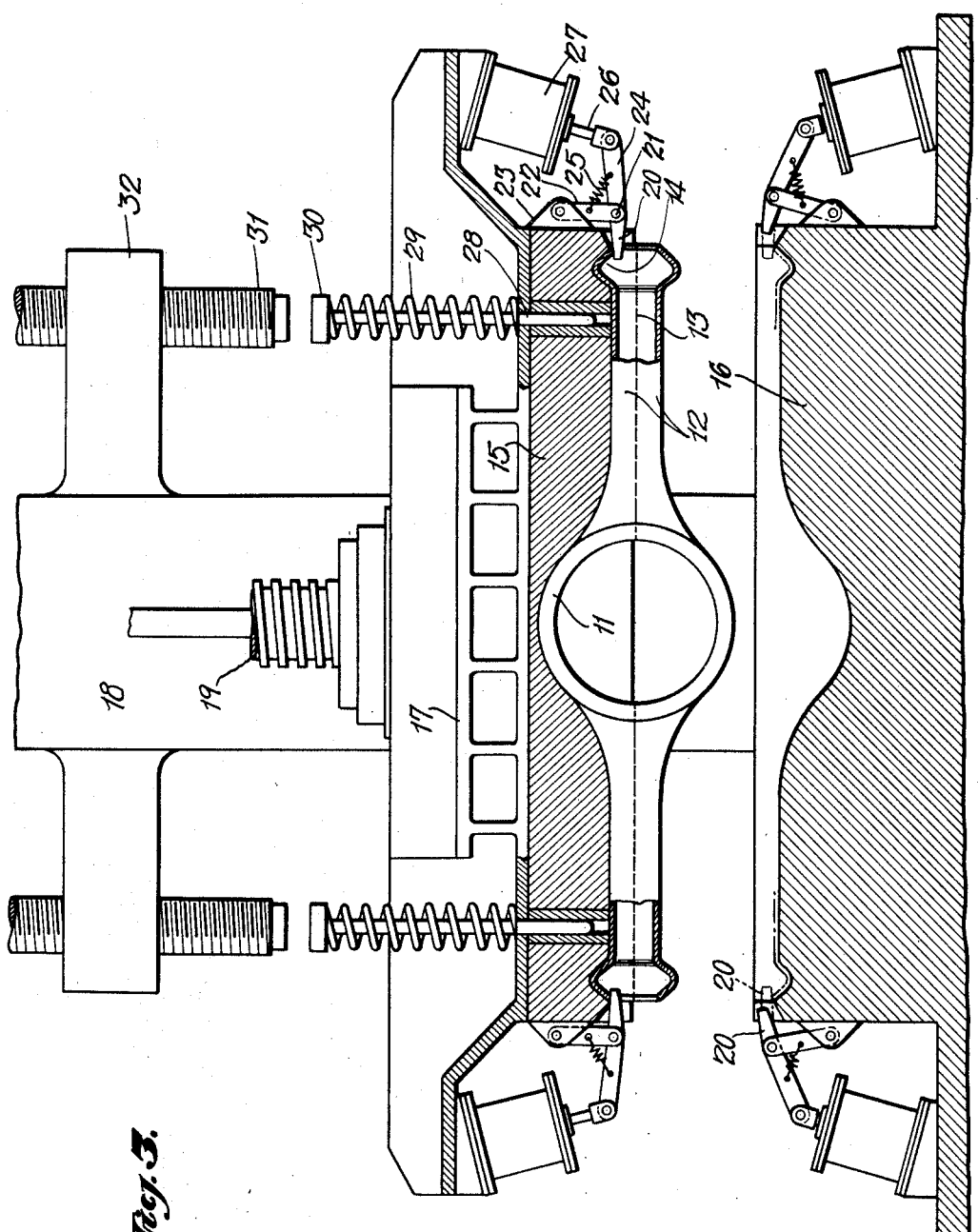

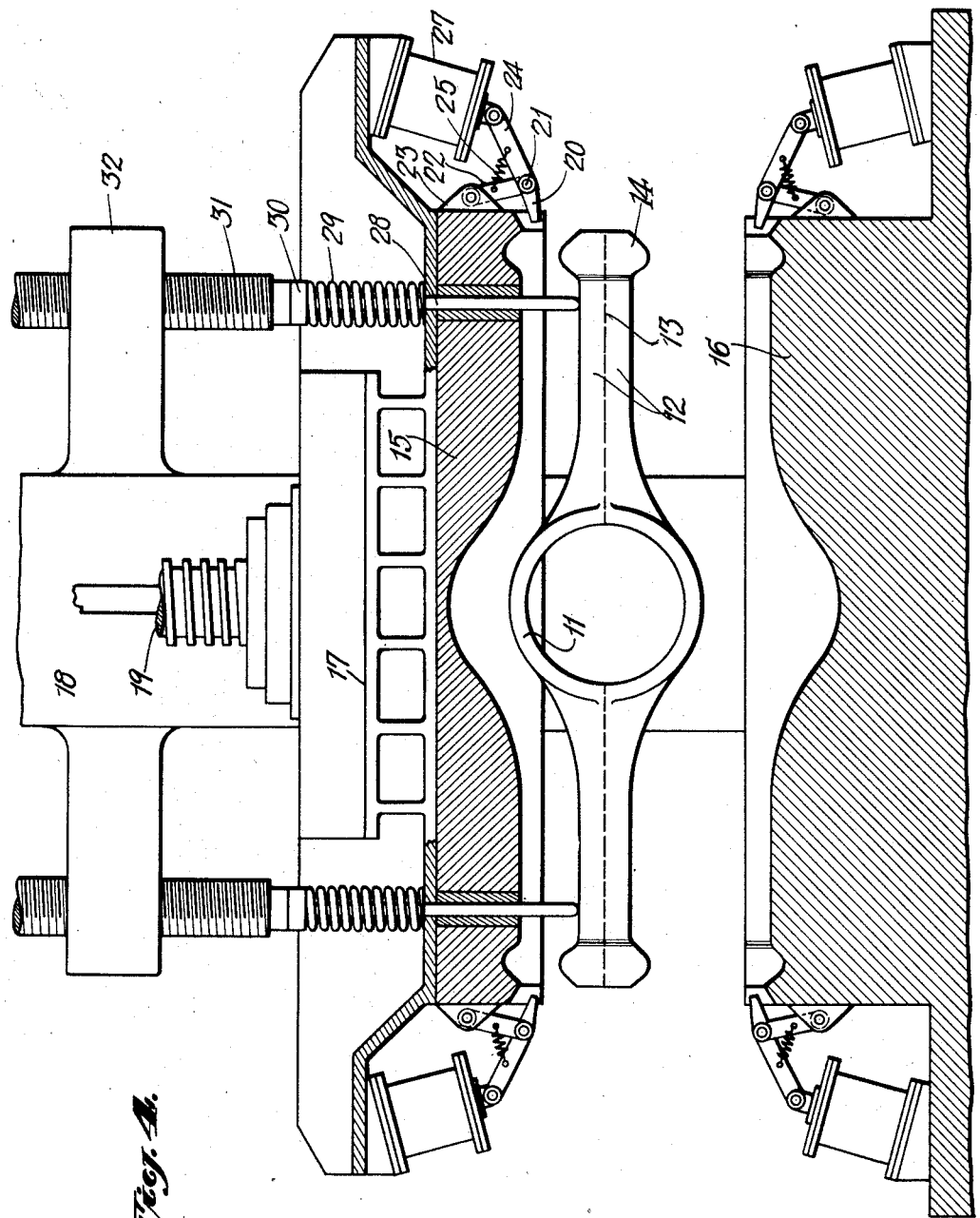

Patented July 5, 1932

1,865,519

UNITED STATES PATENT OFFICE

LE ROY H. HOFFER, OF BROOKLYN, NEW YORK, ASSIGNOR TO METROPOLITAN ENGINEERING COMPANY, OF BROOKLYN, NEW YORK, A CORPORATION OF NEW YORK

WELDING APPARATUS

Application filed February 5, 1930. Serial No. 425,920.

The invention aims to provide simple and efficient means for holding or releasing and removing the work, and particularly in machines for welding segments of axle housings and similar tubular articles by the flash or resistance methods of welding. The accompanying drawings illustrate an embodiment of the invention.

Fig. 1 is a longitudinal vertical section of a machine with the segments clamped in their respective electrodes;

Fig. 2 is a cross section approximately on the line 2—2 of Fig. 1;

Figs. 3 and 4 are sections similar to Fig. 1 showing later stages of the operation.

Axle housings present differences in design and in dimensions, but they generally include an enlarged drum or annular portion at the center and smaller tubular ends extending in opposite directions from the center. In the present drawings, the housing is to be made of two identical blanks with an enlarged central portion 11 and smaller halfround or hollow extensions 12, the segments being welded along longitudinal edges 13 as shown in Fig. 4. The ends of the blank are bent outward and inward to form oblique flanges 14 which are to be subsequently reshaped. But the shape at the ends may be varied as desired.

The electrodes 15 and 16 have their faces recessed to fit and embrace the segments, the edges of the latter projecting slightly beyond the faces of the electrodes. See Fig. 2. The segments are clamped in the electrodes in the position of Fig. 1. The upper electrode is lowered; the ram 17 on which it is mounted being carried between fixed guides 18 and moved by a screw 19. When the edges of the segments are brought together a current is passed across the joints. They are very lightly held together, or even slightly separated, so as to maintain an arc or flash which very quickly softens the edges. The operation proceeds by forcing the edges together, taking up and extruding laterally a small quantity of metal and generally cutting off the current before the takeup is completed. For such methods of welding the two segments have to be clamped firmly in their respective electrodes.

Clamping means are provided at the ends of each electrode. Each clamp 20 is pivoted at 21 on the free end of a link 22 which is pivoted at its opposite end to a bearing 23 on the end of the electrode. The clamp 20 has an operating arm 24 connected by a tension spring 25 to the link 22 tending to release the clamp 20. The operating arm 24 is actuated by a piston rod 26 connected to its rear end and operated by a pneumatic cylinder 27. There is one such clamping mechanism at each end of each electrode. The air cylinders may be operated by mechanically or electrically controlled valves. Preferably they are double acting so as to positively actuate the clamps in both directions. Or they may be replaced by electro-magnets, double-acting or single-acting against springs, or by other power-operated devices. And in any case, they may be controlled manually or automatically by the moving parts of the machine.

There is very little space between the electrodes when they come together in welding position. The mechanism is particularly adapted to the contracted space available at the ends of small tubes. The clamps move between their advanced and retracted positions in paths which lie entirely back of the plane of the segment edges, and the actuating means lies also back of this plane. The combination of link support 22 and thrusting rod 26 gives to the clamp a longitudinal movement into and out of the segments with a transverse movement into and out of engagement with the work. Compare the full line and the dotted line positions in the lower left end, Fig. 3.

The parts are clamped as in Fig. 1 until the welding operation is completed. The lower clamps are then withdrawn, Fig. 3, and the ram raised, the welded housing being held by the upper clamps. These must therefore be strong enough to carry the weight and to overcome the tendency to stick in the lower electrode.

After the welded housing is lifted out of the the lower electrode the upper clamps are released while the ram is still rising. In the last part of the upward movement the housing is knocked out of the upper electrode, in which it tends to stick firmly. Various knockout devices may be used, preferably of the type illustrated.

Knockout rods 28 are carried in the end portions of the upper electrode in position to engage the tubular portions of the housing near its ends, where it is best adapted to withstand the blow. Striking the housing at widely separated points they exert a pressure which is distributed over the entire length of the housing and is less adapted to distort it than if the pressure were more concentrated locally. The rods are held up by springs 29 and have heads 30 which are in line with stops 31 threaded for vertical adjustment in brackets 32 on the fixed frame 18 of the machine. The stops can be adjusted to cause the two rods to strike the work at the same point in the upward travel of the electrode.

Various modifications may be made in detail by those skilled in the art without departing from the invention as defined in the following claims.

What I claim is:

1. In a machine of the class described for flash welding segments of a tubular article, the combination of a movable electrode and a stationary electrode, each recessed to carry a segment of the tubular article, means to retain each segment in each recess, each of said means being independently operable, and automatically operating means to disengage the welded segments from one of said electrodes.

2. In a machine of the class described for flash welding segments of a tubular article, the combination of a pair of electrodes recessed to carry the segments of the article, and means to retain the segments in said recesses, said means comprising clamping members movable with the electrodes and operatively arranged to engage each end of the tubular sections within the electrode recess.

3. In a machine of the class described for flash welding segments of a tubular article, the combination of a pair of electrodes recessed to carry the segments of the article, and means to retain the segments in said recesses, said means comprising clamping members attached to the electrodes and adapted to engage each end of the tubular sections within the electrode recess, and power actuated means to effect the engagement and disengagement of the clamping members with the segments, the means operating to clamp one of the segments being substantially operatively independent of the means operating to clamp the other segment.

4. In a machine of the class described for flash welding segments of a tubular article, the combination of a pair of electrodes recessed to carry the segments of the article, and means to retain the segments in said recesses, said means comprising clamping members attached to said electrodes and adapted to engage each end of the tubular sections to support the same within the electrode recess, and means operatively connected to said clamping members to effect the engagement and disengagement thereof with the segments, each of said clamping means being operatively positioned substantially behind the plane of the welding edges of said segments.

5. In a machine of the class described for flash welding segments of a tubular article, the combination of a pair of electrodes recessed to carry the segments of the article, and means to retain the segments in said recesses, said means comprising clamping members attached to said electrodes and adapted to engage each end of the tubular sections to support the same within the electrode recess, and means operatively connected to said clamping members to effect the engagement and disengagement thereof with the segments, each of said clamping means being operatively positioned substantially behind the plane of the welding edges of said segments, and each pair of said clamping means being substantially operable independent of the other pair.

6. In a machine of the class described for flash welding segments of a tubular article, the combination of a pair of electrodes, one of which is movable and each of which is recessed to carry the segments of the article, means to retain the segments in said recesses, and means to disengage said segments subsequently to the welding operation, said means comprising a plurality of knock-out members positioned with respect to the movable electrode to function upon a movement of the movable electrode.

7. In a machine of the class described for flash welding segments of a tubular article, the combination of a pair of electrodes one of which is movable and each of which is recessed to carry the segments of the article, means to retain the segments in each electrode, said means comprising clamping members arranged to engage the ends of the segments at a point substantially behind the plane of welding, power actuated means to effect the engaging and disengaging of the clamping members on said segments, and means to disengage the welded article from one of the electrodes, said means being operative by a movement of the movable electrode.

8. In a machine of the class described for flash welding segments of a tubular article, the combination of a pair of electrodes one of which is movable and each of which is recessed to carry the segments of the article, means to retain the segments in each electrode, said means comprising clamping members arranged to engage the ends of the segments at a point substantially behind the plane of welding, automatically operated power actuated means to effect the engaging and disengaging of the clamping members on said segments, and means to disengage the welded article from one of the electrodes, said means being operative by a movement of the movable electrode.

In witness whereof, I have hereunto signed my name.

LE ROY HOFFER.